(12) United States Patent
Gong et al.

(10) Patent No.: US 10,788,997 B2
(45) Date of Patent: Sep. 29, 2020

(54) METHOD AND DEVICE FOR STORAGE MANAGEMENT WITH METADATA STORED IN DISK EXTENTS IN AN EXTENT POOL

(71) Applicant: EMC IP Holding Company LLC, Hopkinton, MA (US)

(72) Inventors: Shaoqin Gong, Beijing (CN); Hongpo Gao, Beijing (CN); Jian Gao, Beijing (CN); Jamin Jianbin Kang, Beijing (CN); Ree Lei Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 16/021,651

(22) Filed: Jun. 28, 2018

(65) Prior Publication Data

US 2019/0004721 A1 Jan. 3, 2019

(30) Foreign Application Priority Data

Jun. 30, 2017 (CN) .......................... 2017 1 0524413

(51) Int. Cl.
*G06F 12/00* (2006.01)
*G06F 3/06* (2006.01)
(52) U.S. Cl.
CPC ............ *G06F 3/0631* (2013.01); *G06F 3/061* (2013.01); *G06F 3/0604* (2013.01); *G06F 3/0619* (2013.01); *G06F 3/0644* (2013.01); *G06F 3/0689* (2013.01)

(58) Field of Classification Search
CPC .... G06F 3/0631; G06F 3/0644; G06F 3/0689; G06F 3/0619; G06F 3/0604; G06F 3/061
USPC ......................................................... 711/114
See application file for complete search history.

(56) References Cited

U.S. PATENT DOCUMENTS

| | | | |
|---|---|---|---|
| 10,146,456 B1 * | 12/2018 | Gao ...................... G06F 3/0619 |
| 10,146,624 B1 * | 12/2018 | Gong .................. G06F 11/1092 |
| 2007/0226447 A1 * | 9/2007 | Shimozono ........... G06F 3/0644 711/170 |
| 2008/0091972 A1 * | 4/2008 | Tanaka .................. G06F 11/008 714/5.11 |

* cited by examiner

*Primary Examiner* — Mardochee Chery
(74) *Attorney, Agent, or Firm* — BainwoodHuang (57) ABSTRACT

A method and device for storage management comprising: in response to receiving a request for creating an extent pool, creating the extent pool at least on a user disk, the extent pool comprising a plurality of disk extents; storing data in at least one disk extent of the plurality of disk extents; and storing address information for locating the at least one disk extent in a system disk communicably connected to the user disk. Through the technical solution of the present disclosure, the user can store metadata associated with RAID in the user disk and load metadata associated with RAID from the user disk so as to reduce the access and load of the system disk.

15 Claims, 5 Drawing Sheets

METHOD AND DEVICE FOR STORAGE MANAGEMENT WITH METADATA STORED IN DISK EXTENTS IN AN EXTENT POOL

RELATED APPLICATIONS

This application claim priority from Chinese Patent Application Number CN 201710524413.3, filed on Jun. 30, 2017 at the State Intellectual Property Office, China, titled "STORAGE MANAGEMENT METHOD AND DEVICE" the contents of which is herein incorporated by reference in its entirety.

FIELD

Embodiments of the present disclosure generally relate to storage device, and more specifically, to a method and device for storage management.

BACKGROUND

Redundant array of independent disks (RAID) is a storage technology with high performance and high reliability. The technology combines a series of separate disks in different ways to provide logical disks. RAID technology has been widely applied in various scenarios of data storage. Commonly used RAID technologies include RAID0, RAID1, RAID5, RAID6, RAID10, and so on.

In the current operation, particularly after a system is restarted, to provide IO services to extent pools created by user, it is necessary to read and write disk mapping information associated with the extent pool and RAID group mapping information from and to the system disk, which means that system disk has considerable IO pressure. With the increasing number of reading and writing tasks such as metadata of disk mapping information and RAID group mapping information, JO performance of the system disk will encounter a bottleneck.

In addition, metadata are generally stored in a Home Database in the system disk. However, this kind of database usually has small capacity. With the increasing number of disks configured in the system and the increasing number of created extent pools, this kind of database will be incapable of supporting all the metadata for storage.

Therefore, a more simple and effective storage management technology is desired to solve these problems.

SUMMARY

Embodiments of the present disclosure provide a method, device and associated computer program product for storage management.

In a first aspect of the present disclosure, there is provided a method of storage management. The method includes: in response to receiving a request for creating an extent pool, creating an extent pool at least on a user disk, the extent pool including a plurality of disk extents; storing data in at least one disk extent of the plurality of disk extents; and storing address information for locating at least one disk extent in a system disk communicably connected to the user disk.

In some embodiments, storing the data in at least one disk extent of the plurality of disk extents may include: creating a redundant array of independent disks (RAID) in the extent pool; and storing metadata associated with RAID in the at least one disk extent.

In some embodiments, the method may further include: storing, in the at least one disk extent, identity information of the extent pool or size information of the plurality of disk extents in the extent pool.

In some embodiments, storing the data in the at least one disk extent of the plurality of disk extents may include: storing the data in three disk extents on different drives in the plurality of disk extents.

In some embodiments, the method may further include: loading the address information for locating at least one disk extent from the system disk; and loading data from the at least one disk extent based on address information.

In some embodiments, loading data from the at least one disk extent based on address information may include: loading metadata associated with a redundant array of independent disks (RAID) from the at least one disk extent, the RAID being created on the extent pool.

In some embodiments, the method may further include: loading the extent pool and the RAID based on the metadata in the at least one disk extent.

In a second aspect of the present disclosure, there is provided an electronic device. The electronic device includes: at least one processing unit; and at least one memory coupled to the at least one processing unit and storing machine-executable instructions. The instructions, when executed by the at least one processing unit, cause the electronic device to perform acts, including: in response to receiving a request for creating an extent pool, creating an extent pool at least on a user disk, the extent pool including a plurality of disk extents; storing data in at least one disk extents of the plurality of disk extents; and storing address information for locating the at least one disk extent in a system disk communicably connected to the user disk.

In a third aspect of the present disclosure, there is provided a computer program product. The computer program product is tangibly stored on a non-transient machine-readable medium and includes machine-executable instructions which, when executed, causing the machine to perform steps of the above method.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In the example embodiments of the present disclosure, the same reference symbols usually refer to the same components.

DETAILED DESCRIPTION OF EMBODIMENTS

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1:
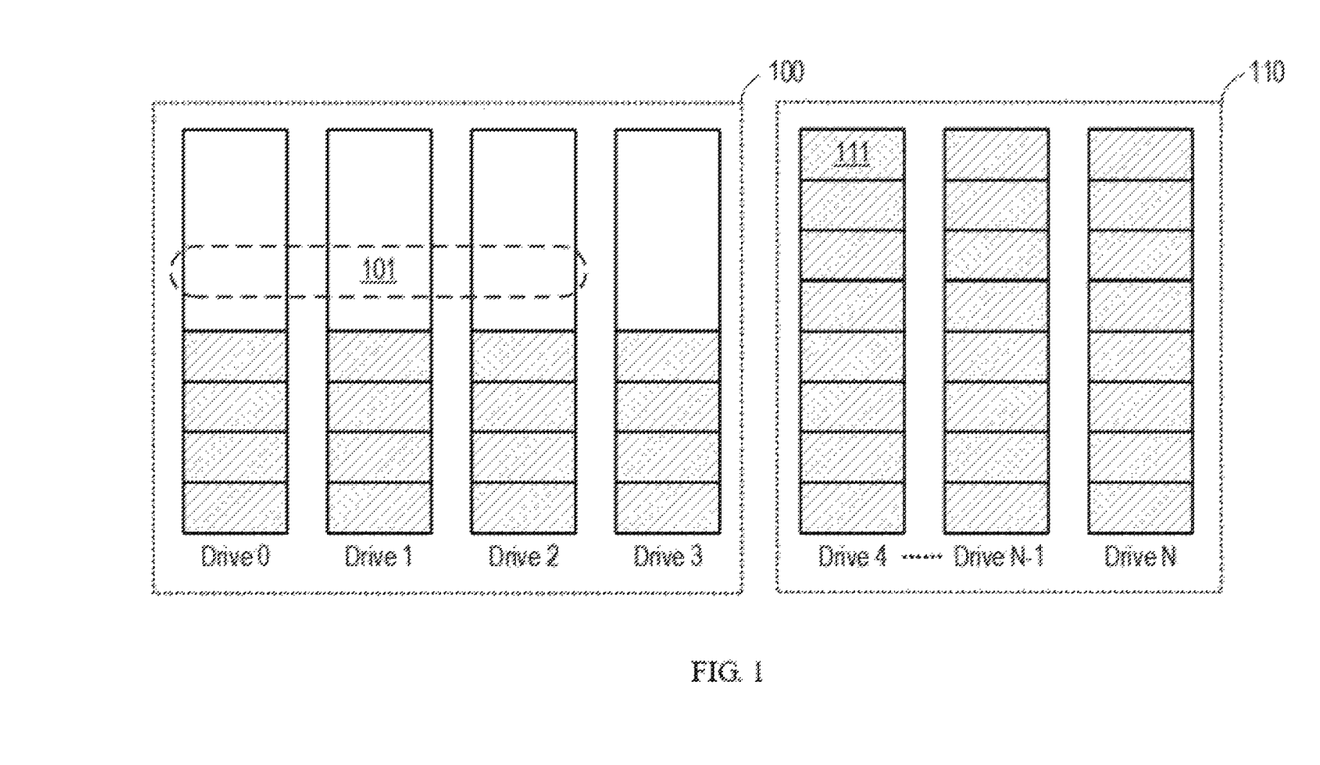
FIG. 1 illustrates a schematic diagram for storing data of metadata associated with RAID and the like according to the prior art.

FIG. 1 illustrates a schematic diagram for storing data of metadata associated with RAID and the like according to the prior art. FIG. 1 illustrates a system disk 100 and a user disk 110 communicably connected to the system disk. As an example, the system disk 100 contains drive 0, drive 1, drive 2 and drive 3, and user disk 110 contains drive 4, . . . , drive N−1 and drive N. Each drive contains a plurality of disk extents drawn with slants. A part of the drives (such as drives 0, 1, 2 and 3) contain system-dedicated extents drawn as blank. The system-dedicated extents (such as 101) drawn as blank are configured to store dedicated data of the system disk and the extents drawn with slants (such as disk extent 111) are configured to store other data. The user would usually create an extent pool at least on the user disk 110, the extent pool containing a plurality of disk extents including, such as disk extent 111.

As stated above, when RAID technology is applied to combine the disks, data such as metadata associated with RAID are usually stored in the form of home database into the system-dedicated extents drawn as blank in the system disk 100. As an example, as shown in FIG. 1, data are stored in the system-dedicated extent 101. Since 101 is illustrated as belonging to a different drive, the stored data are provided with triple-mirror-level protection. In other words, when the drive (such as drive 0) that the extent for storing the metadata associated with RAID belongs to stops working, the corresponding metadata stored in extents on other drives (such as drives 1 and 2) are still accessible.

However, the current metadata storage management method is still defective. First of all, in order to provide JO services to the extent pool created by user, it is necessary to read and write disk mapping information associated with the extent pool and RAID group mapping information from and to the system disk, which means that system disk has considerable IO pressure. With the increasing number of reading and writing tasks such as metadata of disk mapping information and RAID group mapping information, IO performance of system disk will encounter a bottleneck. Secondly, as the home database has small capacity, with the increasing number of disks configured in the system and the increasing number of created extent pools, this kind of database will be incapable of supporting all the metadata for storage.

To at least solve the above and other potential problems and defects, embodiments of the present disclosure provide a novel storage management scheme. The principles of this storage management scheme will be illustrated below in detail with reference to FIG. 2.

Figure 2:
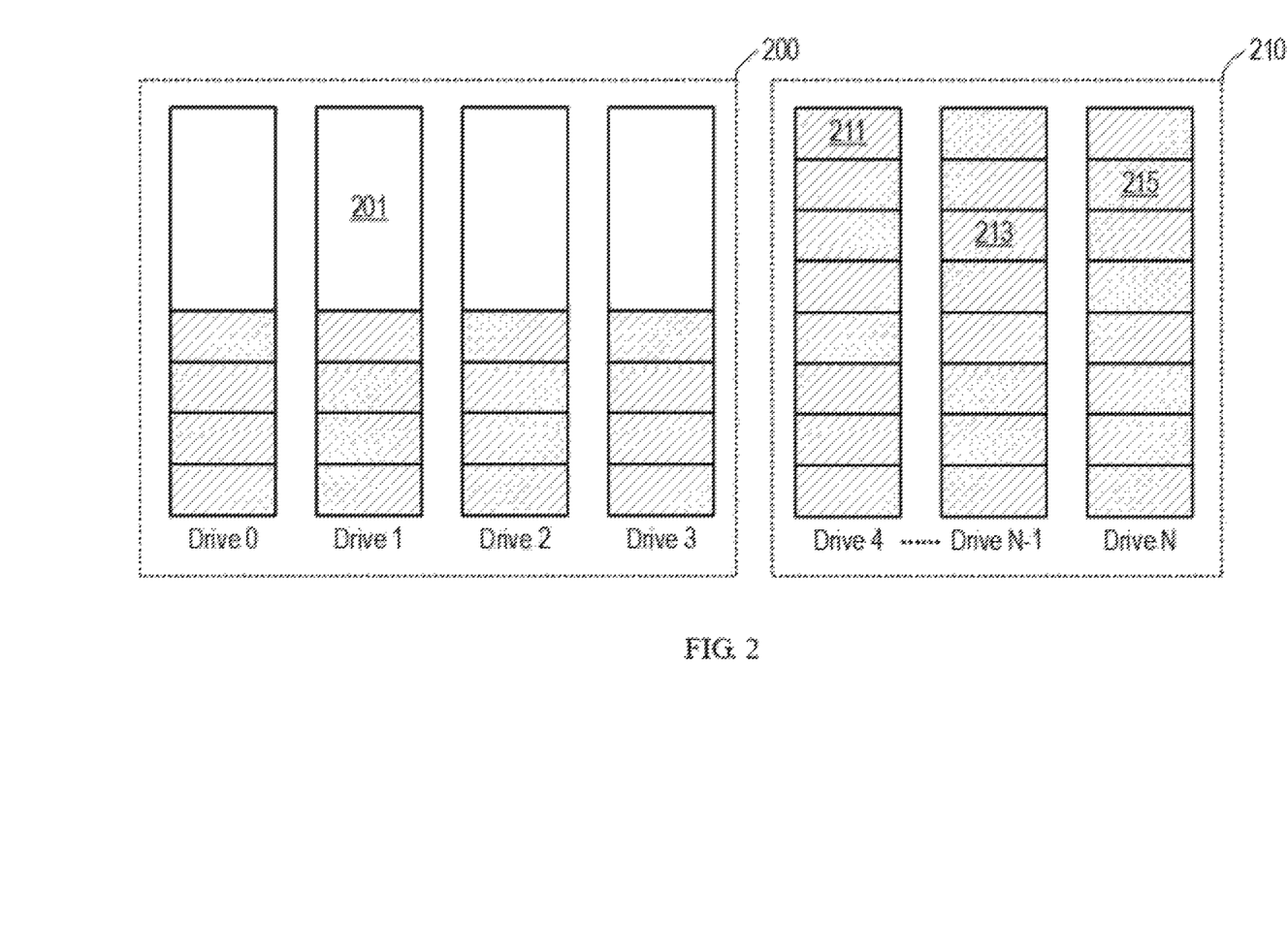
FIG. 2 illustrates a schematic diagram for storing data of metadata associated with RAID and the like according to the embodiments of the present disclosure.

FIG. 2 illustrates a schematic diagram for storing data of metadata associated with RAID and the like according to the embodiments of the present disclosure. FIG. 2 illustrates a system disk 200 and a user disk 210 communicably connected to the system disk. As an example, the system disk 200 contains drive 0, drive 1, drive 2 and drive 3, and the user disk 210 contains drive 4, . . . , drive N−1 and drive N. It shall be appreciated that although illustrated as similar to FIG. 1, FIG. 2 is shown only to solve the technical problem of the prior art illustrated in FIG. 1, rather than to limit the scope of protection of the present disclosure. As shown in FIG. 2, each drive contains a plurality of disk extents drawn with slants. A part of the drives (such as drives 0, 1, 2 and 3) contain system-dedicated extents drawn as blank. The system-dedicated extents (such as 201) drawn as blank are configured to store dedicated data of the system disk and the extents drawn with slants (such as disk extents 211, 213 and 215) are configured to store other data. The user may create an extent pool at least on the user disk 210, the extent pool containing a plurality of disk extents including, such as disk extents 211, 213 and 215.

To strip the operation of reading and writing metadata from the system disk 200, it is possible to store metadata on the user disk 210. As shown in FIG. 2, in the extent pool created by user, metadata can be stored in disk extents 211, 213 and 215. Since disk extents 211, 213 and 215 belong to different drives 4, N−1 and N, respectively, triple-mirror-level protection is provided for the stored metadata. In other words, when the drive (such as drive 4) that the extent for storing metadata associated with RAID belongs to stops working, the corresponding metadata stored in extents on other drives (such as drives N−1, N) still accessible. In addition, when the drive (such as drive 4) that the extent for storing the metadata associated with RAID belongs to stops working, disk extents on drives apart from drives 4, N−1 and N may be used to replace the disk extent that stops working. Then, address information of disk extents 211, 213 and 215 storing metadata may be stored in the system-dedicated extent (such as 201) of system disk 200. In this way, when the user needs to read or write metadata, it is possible to firstly load address information for locating disk extents 211, 213 and 215 from system disk 200, and then load metadata from disk extents 211, 213 and 215 based on the address information.

Figure 3:
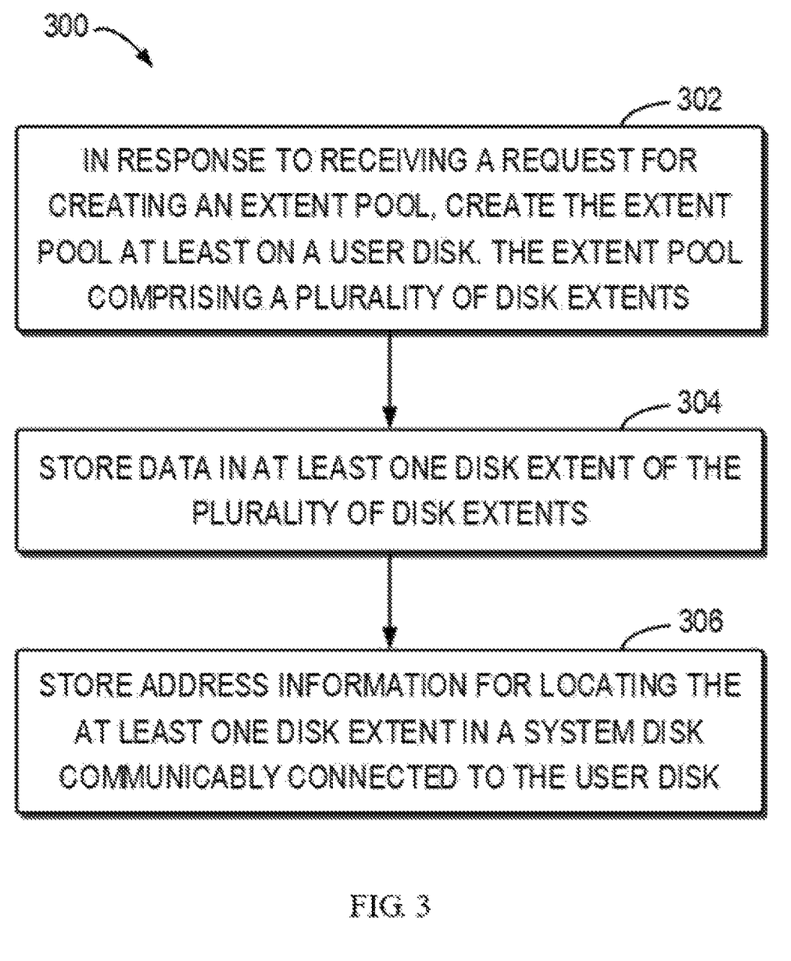
FIG. 3 illustrates a flowchart of a process or method for storing data of metadata associated with RAID and the like according to the embodiments of the present disclosure.

To illustrate the main process and details of storage management for metadata more clearly, now reference is made to FIG. 3. FIG. 3 illustrates a flowchart of a process or method 300 for storing data of metadata associated with RAID and the like according to the embodiments of the present disclosure. In some embodiments, method 300 can be implemented in the device shown in FIG. 5 below. Now in combination with DIG 2, a process or method 300 shown in FIG. 3 for storing data according to the embodiments of the present disclosure will be described below.

At 302, in response to receiving a request for creating an extent pool, an extent pool is created at least on the user disk 210, the extent pool containing a plurality of disk extents, such as disk extents 211, 213, 215 and others drawn with slants. In some embodiments, the user can create an extent pool only on the user disk 210. In some embodiments, the user may also create an extent pool on the user disk 210 and a part of the system disks 200. As an example, this part of system disk 200 is the part of system disk 200 drawn with slants shown in FIG. 2. Creating an extent pool on the user disk described in the present disclosure can be construed as creating an extent pool on the whole user disk or creating an extent pool on a part of the user disk. The creating process of the extent pool can be controlled by the user arbitrarily and precisely. By creating an extent pool, a proper storage position may be prepared for the metadata to be stored. That is, the metadata will be stored at a side of the user disk, rather than in the system disk in a conventional manner.

At 304, data are stored in at least one disk extent of the plurality of disk extents. In some embodiments, storing data in at least one disk extent of the plurality of disk extents may include: creating RAID in the extent pool; and storing metadata associated with the created RAID in at least one disk extent. As an example, all the disk information, disk mapping information, RAID group information and RAID group mapping information may be stored in at least one disk extent divided on the user disk 210. As an example, all the disk information, disk mapping information, RAID group information and RAID group mapping information may be stored in a distributed database in at least one disk extent divided on the user disk 210. As an example, it is possible to store identity information of the extent pool and/or size information of a plurality of disk extents in the extent pool into at least one disk extent so that the system disk can distinguish extent pools divided by each user. By selecting at least one disk extent from a plurality of disk extents contained in the created extent pool and storing the metadata to be stored into the disk extent (or storing the database stored with the metadata into the disk extent), operation of storing the metadata at the user side is completed. Thus, the storage of metadata by the user can be realized by just accessing the user disk, thereby reducing IO pressure of the system disk significantly.

In some embodiments, storing data in at least one disk extent of the plurality of disk extents includes: storing data in three disk extents on different drives in a plurality of disk extents. As an example, the metadata may be stored in disk extents 211, 213 and 215 on different drives. As an example, it is also possible to store the metadata only in one disk extent in the disk extents drawn with slants. By storing data in a disk extent at a side of the user disk, the access of the system disk by the user may be reduced. When data are needed to be read or written, it is possible to implement the operation in the user disk directly.

At 306, address information for locating the at least one disk extent is stored in the system disk 200 communicably connected to the user disk 210. In some embodiments, address information of the extent pool created by the user and address information of the disk extent storing data may be stored in the system-dedicated extent 201 of the system disk 200. As an example, the identity information of the extent pool created by the user and address information of the disk extent for storing data are stored in a home database inside the system-dedicated extent 201. As an example, identity information of the extent pool created by the user and address information of the disk extent for storing data are stored in the system-dedicated extent 101 shown in FIG. 1. Since 101 is illustrated as belonging to three different drives, triple-mirror-level protection is provided for stored data. At this step, by storing the address information of the disk extent storing metadata in the system disk (or a home database of the system disk), the user disk may obtain the storage position of the metadata only by accessing the system disk once at the start-up and after that, any operation to the metadata will not require accessing the system disk, thereby reducing IO pressure of the system disk significantly.

Figure 4:
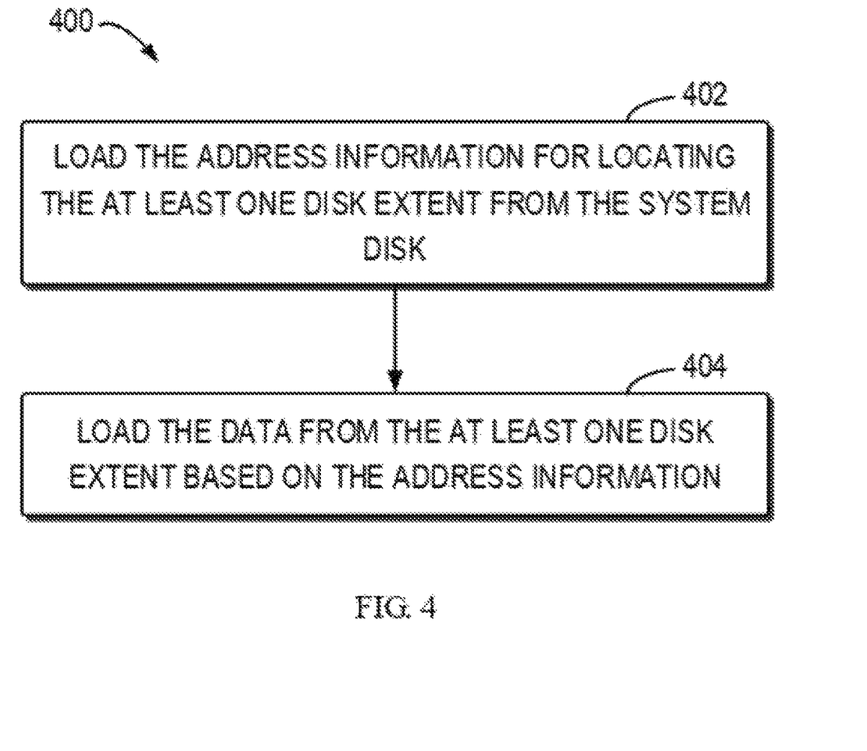
FIG. 4 illustrates a flowchart of a process or method for loading data of metadata associated with RAID and the like according to the embodiments of the present disclosure.

With the method 300 shown in FIG. 3 and other embodiments described above, the user may store metadata associated with RAID into the user disk, thereby reducing the access and the load of the system disk. Besides, as the user disk for storing metadata can be configured by the user flexibly, the volume of metadata will not be limited by the system disk so that the scalability of the system may be improved. After the metadata associated with RAID is configured to be stored in the database at the corresponding position of the user disk, the process of loading the metadata by the user, particularly the process of loading the metadata after system restarted, also needs to perform further adaptation. FIG. 4 illustrates a flowchart of a process or method 400 for loading data of metadata associated with RAID and the like according to the embodiments of the present disclosure. In some embodiments, method 400 can be implemented in the device shown in FIG. 5. Now referring to FIG. 2, the process or method 400 illustrated in FIG. 4 for storing data according to the embodiments of the present disclosure will be described below.

At 402, address information for locating at least one disk extent is loaded from system disk 200. In some embodiments, address information of at least one disk extent storing metadata may be obtained from a home database of the system disk 200. As an example, address information of disk extents 211, 213 and 215 storing metadata associated with RAID may be obtained from the home database of the system disk 200. In some embodiments, after the address information for locating at least one disk extent is loaded, it waits for the at least disk extent to be brought online. As an example, after address information of disk extents 211, 213 and 215 for storing distributed database is loaded, it waits for disk extents 211, 213 and 215 to be brought online. It should be noted that the storage operation about metadata described in the present disclosure only relates to the associated operation of the address information of the disk extents storing metadata for system disk 200, thereby reducing IO operations for the system disk.

At 404, data are loaded from the at least one disk extent based on address information. In some embodiments, loading data from at least one disk extent based on address information includes: loading metadata associated with RAID from at least one disk extent, the RAID being created in the extent pool. In some embodiments, the extent pool and RAID are loaded based on metadata in at least one disk extent. In some embodiments, loading data from at least one disk extent based on address information includes: loading the distributed database from the corresponding disk extent; loading the extent pool based on disk information and disk mapping information stored in the distributed database; and loading all the RAID groups based on the RAID group information and RAID mapping information stored in the distributed database. After the address information of the disk extents storing metadata is obtained, operation for the metadata can be performed without accessing the system disk, thereby releasing IO capability of the system disk and avoiding the bottleneck of the system disk mentioned above.

With method 400 shown in FIG. 4 and other embodiments described above, the user may load metadata associated with RAID from the user disk so as to reduce access and load of the system disk. Besides, since the user disk for storing metadata may be configured by user flexibly, the capacity of the metadata will not be limited by the system disk, thereby improving scalability of the system.

Figure 5:
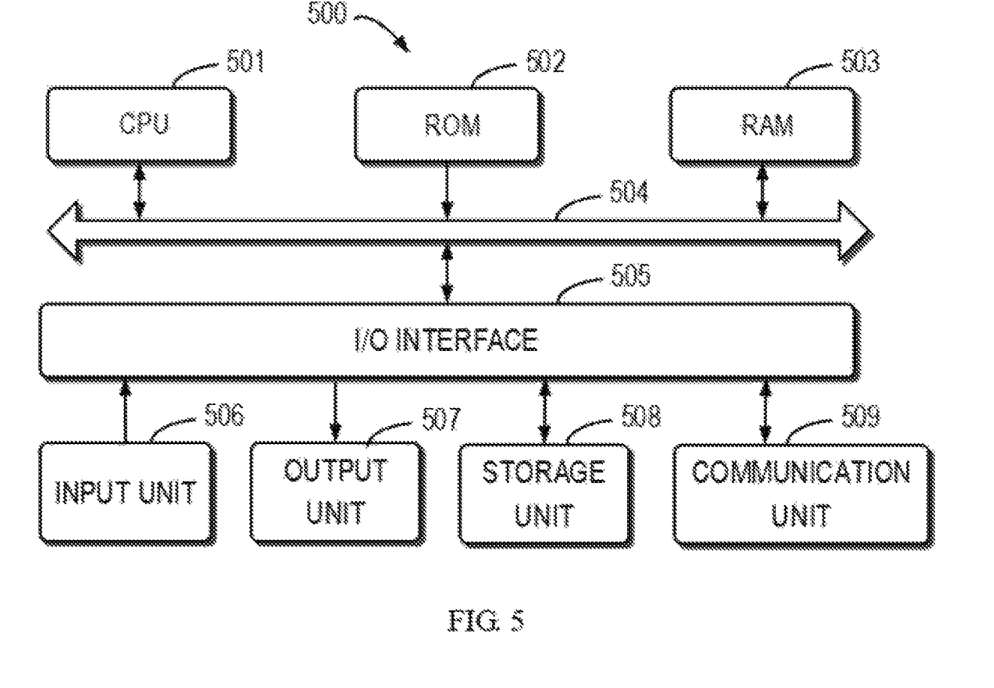
FIG. 5 illustrates a schematic block diagram of a device for storage management of data according to the embodiments of the present disclosure.

FIG. 5 illustrates a schematic block diagram of an electronic device 500 that may be used to implement embodiments of the present disclosure. As illustrated, the device 500 includes a central processing unit (CPU) 501, which may perform various appropriate actions and processing according to the computer program instructions stored in a read-only memory (ROM) 502 or the computer program instructions loaded from a storage unit 508 into a random access memory (RAM) 503. The RAM 503 also stores all kinds of programs and data required by operating the storage device 500. CPU 501, ROM 502 and RAM 503 are connected to each other via a bus 504, to which an input/output (I/O) interface 505 is also connected.

A plurality of components in the device 500 are connected to the I/O interface 505, comprising: an input unit 506, such as keyboard, mouse and the like; an output unit 507, such as various types of display, loudspeakers and the like; a storage unit 508, such as magnetic disk, optical disk and the like; and a communication unit 509, such as network card, modem, wireless communication transceiver and the like. The communication unit 509 allows the device 500 to exchange information/data with other devices through computer networks such as Internet and/or various telecommunication networks.

Each procedure and processing described above, such as method 300 and 400 may be executed by a processing unit 501. As an example, in some embodiments, the method 300 and 400 may be implemented as computer software programs, which are tangibly included in a machine-readable medium, such as storage unit 508. In some embodiments, the computer program may be partially or completely loaded and/or installed to the device 500 via ROM 502 and/or the communication unit 509. When the computer program is loaded to RAM 503 and executed by CPU 501, one or more acts of the above described method 300 and 400 are implemented. Alternatively, in the other embodiments, CPU 501 may also be configured to execute the above described process in any suitable manner.

Generally, the various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing devices. When various aspects of the embodiments of the present disclosure are illustrated or described into block diagrams, flow charts, or other graphical representations, it would be appreciated that the block diagrams, apparatus, system, technique or method described here may be implemented, as non-restrictive examples, in hardware, software, firmware, dedicated circuit or logic, common software or controller or other computing devices, or some combinations thereof.

As an example, the embodiments of the present disclosure can be described in a context of machine-executable instructions which are included, for instance, in the program module executed in the device on a target real or virtual processor. Generally, a program module includes routine, program, bank, object, class, component and data structure and so on and performs a particular task or implements a particular abstract data structure. In the embodiments, the functions of the program modules can be combined or divided among the described program modules. The machine executable instructions for the program module can be executed locally or in a distributed device. In the distributed device, the program module can be located between the local and remote storage mediums.

The computer program code for implementing the method of the present disclosure may be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partially on a computer, partially on a computer as an independent software packet and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In the present invention, some features described in the context of separate embodiments may also be integrated into a single implementation. On the contrary, various features described in the context of a single implementation may also be separately implemented in a plurality of implementations or in any suitable sub-group.

Compared with the prior art, embodiments of the present disclosure possess various advantages. For example, embodiments of the present disclosure enable updating signature of the session automatically after migration. The embodiments of the present disclosure may further enable updating the signature of the session automatically based on different scenarios and user's requirements so that the replication session in the network storage device can be maintained.

Through the above depiction and the teaching given by the drawings, many modifications and other implementations of the present disclosure described herein can be realized by those skilled in the art related to the present disclosure. Therefore, it is to be understood that the embodiments of the present disclosure are not limited to the specific embodiments disclosed herein and the modifications and other implementations aim to be included in the scope of the present disclosure. Furthermore, though the above depiction and related drawings describe the example embodiments under the context of some example combinations of components and/or functions, it shall be realized that alternative embodiments provide different combinations of components and/or functions without departing from the scope of the present disclosure. In this respect, for example, other forms of combinations of components and/or functions different from those described explicitly above are also expected to be included in the scope of the present disclosure. Although specific terms are employed here, they are used in a general and descriptive sense rather than for limiting purpose.

We claim:

1. A method of storage management, comprising:
   in response to receiving a request for creating an extent pool, creating the extent pool at least on a user disk, the extent pool comprising a plurality of disk extents;
   storing data in at least one disk extent of the plurality of disk extents in the extent pool on the user disk, at least in part by creating a redundant array of independent disks (RAID) on the extent pool and storing metadata associated with the RAID in the at least one disk extent, wherein storing the data in the at least one disk extent of the plurality of disk extents in the extent pool on the user disk includes storing the data in three disk extents on different drives in the plurality of disk extents in the extent pool on the user disk and providing triple-mirror-level protection for the metadata stored on the three disk extents on different drives in the plurality of disk extents in the extent pool on the user disk; and
   storing address information for locating the at least one disk extent in a system disk communicably connected to the user disk.

2. The method according to claim 1, further comprising:
   storing, in the at least one disk extent, identity information of the extent pool or size information of the plurality of disk extents in the extent pool on the user disk.

3. The method according to claim 1, further comprising:
   loading the address information for locating the at least one disk extent from the system disk; and
   loading the data from the at least one disk extent based on the address information.

4. The method according to claim 3, wherein loading the data from the at least one disk extent based on the address information comprises:
   loading metadata associated with a redundant array of independent disks (RAID) from the at least one disk extent, the RAID being created on the extent pool.

5. The method according to claim 4, further comprising:
   loading the extent pool and the RAID based on the metadata in the at least one disk extent.

6. The method of claim 1, wherein storing the metadata associated with the RAID in the at least one disk extent of the plurality of disk extents in the extent pool on the user disk reduces reading and writing of the system disk.

7. An electronic device, comprising:
   at least one processing unit; and
   at least one memory coupled to the at least one processing unit and storing machine executable instructions, the instructions, when executed by the at least one processing unit, causing the electronic device to perform acts, comprising:
      in response to receiving a request for creating an extent pool, creating the extent pool at least on a user disk, the extent pool comprising a plurality of disk extents;
      storing data in at least one disk extent of the plurality of disk extents in the extent pool on the user disk, at least in part by creating a redundant array of independent disks (RAID) on the extent pool and storing metadata associated with the RAID in the at least one disk extent, wherein storing the data in the at least one disk extent of the plurality of disk extents in the extent pool on the user disk includes storing the data in three disk extents on different drives in the plurality of disk extents in the extent pool on the user disk and providing triple-mirror-level protection for the metadata stored on the three disk extents on different drives in the plurality of disk extents in the extent pool on the user disk; and
      storing address information for locating the at least one disk extent in a system disk communicably connected to the user disk.

8. The device according to claim 7, the acts further comprising:
   storing, in the at least one disk extent, identity information of the extent pool or size information of the plurality of disk extents in the extent pool on the user disk.

9. The device according to claim 7, the acts further comprising:
   loading the address information for locating the at least one disk extent from the system disk; and
   loading the data from the at least one disk extent based on the address information.

10. The device according to claim 9, wherein loading the data from the at least one disk extent based on the address information comprises:
    loading metadata associated with a redundant array of independent disks (RAID) from the at least one disk extent, the RAID being created on the extent pool.

11. The device according to claim 10, the acts further comprising:
    loading the extent pool and the RAID based on the metadata in the at least one disk extent.

12. A computer program product for storage management, the computer program product comprising:
    a non-transitory computer readable medium encoded with computer-executable code, the code configured for the execution of:
       in response to receiving a request for creating an extent pool, creating the extent pool at least on a user disk, the extent pool comprising a plurality of disk extents;
       storing data in at least one disk extent of the plurality of disk extents in the extent pool on the user disk, at least in part by creating a redundant array of independent disks (RAID) on the extent pool and storing metadata associated with the RAID in the at least one disk extent, wherein storing the data in the at least one disk extent of the plurality of disk extents in the extent pool on the user disk includes storing the data in three disk extents on different drives in the plurality of disk extents in the extent pool on the user disk and providing triple-mirror-level protection for the metadata stored on the three disk extents on different drives in the plurality of disk extents in the extent pool on the user disk; and
       storing address information for locating the at least one disk extent in a system disk communicably connected to the user disk.

13. The computer program product of claim 12, the code further configured for the execution of:
    storing, in the at least one disk extent, identity information of the extent pool or size information of the plurality of disk extents in the extent pool on the user disk.

14. The computer program product of claim 12, the code further configured for the execution of:

loading the address information for locating the at least one disk extent from the system disk; and loading the data from the at least one disk extent based on the address information.

15. The computer program product of claim 14, wherein loading the data from the at least one disk extent based on the address information comprises:

loading metadata associated with a redundant array of independent disks (RAID) from the at least one disk extent, the RAID being created on the extent pool.

* * * * *